United States Patent [19]

Allen

[11] 4,373,430
[45] Feb. 15, 1983

[54] HUMIDIFIER FOR A PROOF BOX

[75] Inventor: Beverly J. Allen, Seattle, Wash.

[73] Assignee: Oscar Lucks Company, Seattle, Wash.

[21] Appl. No.: 947,438

[22] Filed: Oct. 2, 1978

[51] Int. Cl.³ .................. H05B 1/00; A21C 13/00
[52] U.S. Cl. .................................. 99/468; 99/474;
 99/483; 126/348; 126/369; 126/20; 219/362;
 219/401
[58] Field of Search ............... 99/467, 468, 473, 474,
 99/483; 219/401, 333, 362, 273; 34/151;
 126/369, 348, 20

[56] References Cited

U.S. PATENT DOCUMENTS

| | | |
|---|---|---|
| 2,147,024 | 2/1939 | Frisk . |
| 2,148,143 | 2/1939 | Waitzman . |
| 2,749,070 | 6/1956 | Collins .................. 366/185 |
| 2,784,662 | 3/1957 | Grosz et al. . |
| 2,888,006 | 5/1959 | Martin .................. 219/273 |
| 3,087,485 | 4/1963 | Powers .................. 219/273 |
| 3,209,673 | 10/1965 | Howard . |
| 3,456,598 | 7/1969 | MacKay .................. 99/483 |
| 3,518,949 | 7/1970 | Stock . |
| 3,604,895 | 9/1971 | MacKay .................. 219/401 |
| 3,805,561 | 4/1974 | Bullock .................. 34/151 |
| 3,814,901 | 6/1974 | Morhack .................. 219/401 |
| 3,823,661 | 7/1974 | Kells .................. 99/468 |
| 3,931,759 | 1/1976 | Hayashi .................. 99/468 |
| 3,949,733 | 4/1976 | Miller et al. .................. 126/348 |
| 4,010,349 | 3/1977 | Lee .................. 219/401 |
| 4,013,869 | 3/1977 | Orts .................. 219/401 |
| 4,023,476 | 5/1977 | Burgess .................. 99/468 |

*Primary Examiner*—Philip R. Coe
*Assistant Examiner*—Timothy F. Simone
*Attorney, Agent, or Firm*—Gregory W. Moravan; David H. Deits; Don R. Mollick

[57] ABSTRACT

A fast warmup, high capacity, no splash, self-cleaning humidifier for a proof box. The device has an aluminum steam generating heater pan including at least one electrical heating element cast into its base. A reservoir and a float controlled valve attached to the heater pan by a dog leg conduit keeps the level of water in the heater pan at a depth of about one-half inch. The heater pan is mounted for rotation about a horizontal axis, and a drip pan is located beneath the heater pan. For cleaning of accumulated minerals, scale and the like from the heater pan, the heater pan is allowed to heat to over 212° F. while dry. Cooler water from the reservoir is then suddenly added to the hot, dry heater pan resulting in the removal of said accumulated minerals, scale and the like from the heater pan due to thermal shock and the vigorous boiling of the added water. The contents of the heater pan are then dumped into the drip pan by rotating the heater pan about said horizontal axis.

10 Claims, 6 Drawing Figures

HUMIDIFIER FOR A PROOF BOX

BACKGROUND OF THE INVENTION

1. Field of the Invention

This invention relates to a fast warmup, high capacity, no splash, no burnout, self-cleaning humidifier for a proof box used for proofing dough or the like prior to baking.

2. Description of the Prior Art

Humidifiers for proof boxes are generally well known. A proof box generally comprises an insulated cabinet in which the dough to be baked is placed and maintained at a desired temperature prior to baking, so that it may rise to the proper amount. As is well known to those skilled in the art, the relative humidity in the proof box should be maintained at about 80% in order to insure that the outer surface of the dough being proofed does not dry and crack as it is rising.

One approach taken by the prior art to supply humidity to the proof box is to inject steam into the proof box from an external source such as a steam line or a boiler. Such techniques are disclosed, respectively, in U.S. Pat. No. 4,023,406 issued May 17, 1977 to Burgess, Jr. and in U.S. Pat. No. 3,931,759 issued Jan. 13, 1976 to Hayashi.

Another approach is to use a steam generating apparatus located internally of the proof box. This technique disclosed by U.S. Pat. No. 3,518,949 issued July 7, 1970 to Stock and in U.S. Pat. No. 4,010,349 issued Mar. 1, 1977 to Lee. Disclosed in these patents is a proof box humidifier comprising a shallow pan, partially filled with water, having an immersion type heater located directly in the water. Such devices suffer from the drawbacks that minerals, scale and the like deposit on the immersion heaters, thereby reducing their efficiency in transferring heat to the water and thus reducing the amount of steam generated. A further drawback of such devices is that should the water supply fail and the immersion heaters run dry, they are likely to melt entailing the costly and time consuming replacement thereof.

A prior art device of this type is known to applicant and comprises a welded stainless steel pan about 18" long, 10" wide, and 4" deep in which 3 to 3½" of water was maintained during use by a float controlled valve in a reservoir tank coupled to the pan by a straight conduit. Water was supplied to the valve by a ¼" water line. Immersed in the water were three U-shaped, rod type electric heating elements of conventional construction rated at 2000 watts each. The heating elements were wired in a conventional delta configuration to a source of 3-phase AC 208 or 240 volt electric power. A thermostat was coupled to one of the heating elements to turn off power to the heating elements once a predetermined temperature was reached in order to protect the elements from burnout, should the pan run dry during use.

SUMMARY OF THE INVENTION

As indicated, it is a basic object and feature of the present invention to provide a humidifier for a proof box which has a high capacity and a fast warmup time, and which is burnout proof, is no splash and is self-cleaning. Further objects are to provide a quality, relatively low cost and highly durable humidifier for a proof box.

The basic form of the humidifier of the present invention includes a heater pan means for retaining and vigorously boiling a shallow pool of water contained therein. The heater pan means comprises a metal heater pan having an integral base and four sidewalls extending upwardly therefrom and includes at least one electric heating element for heating the heater pan to a temperature sufficient to vigorously boil said shallow pool of water. A water supply means, including a water reservoir tank, maintains a pre-selected depth of water in the heater pan.

The humidifier may include an anti-siphoning water conduit means for conveying wateer from the reservoir tank into the heater pan. The water conduit means has a first end communicating with the interior of the heater pan and a second end communicating with the interior of the reservoir tank, the first end being higher than the second end. Such a construction of the anti-siphoning water conduit means achieves one object of the present invention, which is to prevent undesirable back flow of boiling or hot water from the heater pan into the reservoir tank, caused by boiling or hot water being of a higher temperature than is the water in the conduit means and reservoir tank. Such undesirable backflow might otherwise cause minerals, scaling, or the like to deposit in the conduit means and water supply means thereby clogging them or otherwise rendering them inoperable.

The humidifier of the present invention may also include a support means for supporting the heater pan for selective rotation upon a horizontal axis, a swivel coupling located in the conduit means between its first and second ends, and a drip pan removably mounted to the support means beneath the heater pan. Such a construction helps to achieve one of the objects of the present invention which is to enable the heater pan to be conveniently and quickly emptied into the drip pan by rotating the heater pan about said horizontal axis.

In another aspect of the present invention the heater pan acts as a heat sink and as a radiator for the heating element means and is sized to prevent burnout of said heating element means even in the event that the water supply to the heater pan should fail and cause the heater pan to run dry during use. Such a construction helps to achieve one of the objects of the present invention which is to provide a simple, durable, burnout proof humidifier for a proof box.

A further aspect of the present invention includes a thermostat means having a sensor means connected to the heater pan for turning off the heating element means when the heater pan reaches a predetermined temperature to prevent overheating of the heater pan during use.

One aspect of the present invention specifies that the heater pan is cast in one piece and the heating element means are cast in place in the heater pan base. This insures quick, even distribution of heat from the heating element means to the heater pan; protects the heating element means from the environment, and in particular from contact with water in the heater pan, to prevent corrosion and early failure thereof; and also protects the heating element means from burning out should the heater pan run dry during use since the heater pan acts as a heat sink and radiator for the heating element means.

A further aspect of the present invention specifies that the water supply means maintains the water in the heater pan at a depth of about ⅛". Such a construction has at least three advantages, namely, it increases the steam generated by the heater pan during use; it significantly reduces undesirable splatter and splash of the water in the heater pan when it boils during use; and it reduces the amount of water deposits, scale, and the like which might otherwise be deposited on those portions of the sidewalls of the heater pan which are ordinarily not immersed in the water in the heater pan.

A further object of the present invention is to provide a method of cleaning water deposits, scale and the like which may be deposited during use in the heater pan of the humidifier of the present invention. The method specified which achieves this object includes the steps of heating the heater pan, when it is dry, to a temperature of over 212 degrees F., adding water to the heater pan and allowing it to boil vigorously, and then draining the heater pan. It is theorized that the thermal shock of the water contacting the heated heater pan and its associated water deposits, scale, and the like, as well as the vigorous boiling action of the added water, removes at least a great deal of the undesirable water deposits, scale, and the like from the inner surfaces of the heater pan.

These and further objects, features, advantages, and characteristics of humidifier for a proof box of the present invention will be apparent from the following more description of the preferred embodiments thereof.

DESCRIPTION OF THE PREFERRED EMBODIMENTS

Figure 1:
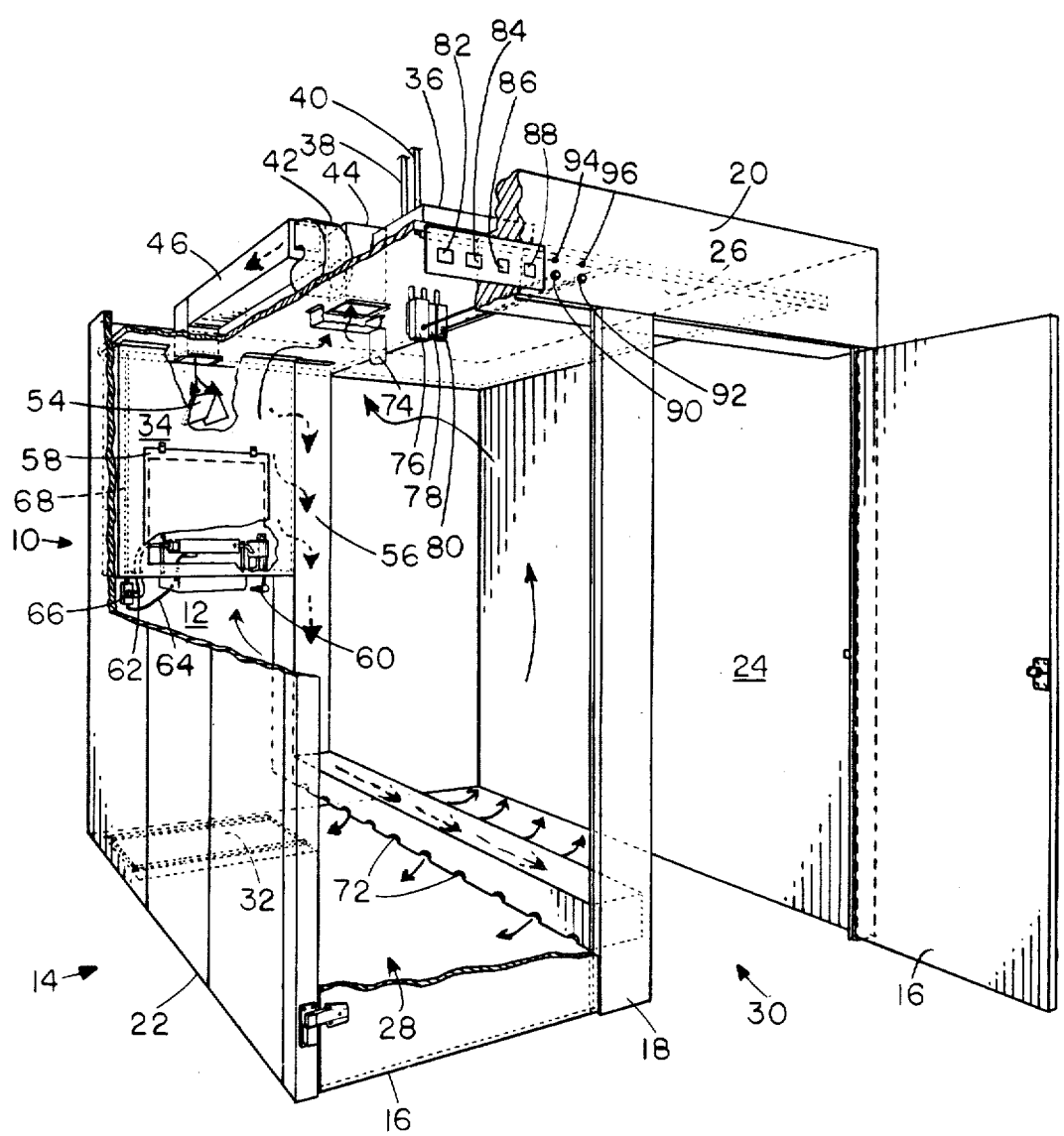
FIG. 1 is an isometric view of a typical proof box in which the humidifier of the present invention is shown located on the back wall thereof.

Referring now to the figures, the humidifier of the present invention, generally designated as 10, is shown mounted on the rear wall 12 of a proof box generally designated at 14. The proof box 14 includes insulated doors 16, middle front panel 18, top front panel 20, opposed sidewalls 22, 24, and a ceiling 26. The proof box illustrated is of the type having no floor per se, the floor of the building in which the proof box is located forming the floor thereof, so that carts loaded with the products to be proofed are simply rolled directly into the proof boxes' left and right compartments. Located on the floor of the left compartment is a cart stop 32 to prevent contact of the carts with the plenum 34 in which the humidifier 10 is located. On the ceiling is a terminal box 36 with 115 volt, 60-cycle, single phase and 208 or 240 volt, 60-cycle, 3-phase power lines 38, 40. Within the terminal box are various electrical components which will be described subsequently.

Also mounted on the ceiling is a squirrel cage blower 42 which draws air from the interior of the proof box 10 through a suction duct 44 and discharges it into a top, heater duct 46. Within the heater duct are electric heating elements 48 of conventional construction, which warm the air passing through the duct 46 in order to maintain the desired temperature within the proof box.

The air, after passing through the heater duct 46, is discharged into the interior of the plenum 34. A baffle plate 54 located within the plenum 34 above the humidifier prevents the air discharged into the plenum from blowing directly on the humidifier.

Within the plenum 34, warm air from the heater duct 46 is mixed with humidity supplied from the humidifier 10 and is then discharged into a vertical duct 56 also mounted on the rear wall of the proof box. Access to the humidifier is provided by removal of a cover plate 58 mounted on the front of the plenum.

Water is supplied to the humidifier through a ¼" water line 60 which is coupled to an exterior source of water. Three phase, 208 or 240 volt AC, and 110 volt, single phase AC electric power are supplied to the humidifier through electric cords 62, 64 plugged into outlets 66 mounted on the rear wall of the proof box. The outlet 66 is supplied with power through electrical cable means 68 which terminate in the terminal box 36.

The warm, humidified air which is supplied to the vertical duct 56 from the plenum 34, travels downwardly through the vertical duct and is expelled into a floor duct 70 located at the bottom of the proof box. Warm, humidified air from the floor duct is discharged into the interior of the proof box through a plurality of holes 72 located along both sides of the floor duct.

Air from the interior of the proof box is then drawn into the suction duct 44 by the squirrel cage blower 42, as has been previously described, and recirculated to achieve the desired humidity and temperature in the proof box.

Mounted on the ceiling 26 inside the proof box are an electric light 74, a humidistat 76, a fixed thermostat 78, and a dry thermostat 80. Mounted on the top front panel 20 are on-off switching duty circuit breakers 82, 84, 86, 88 for the heating elements 108 in the humidifier 10; the heating elements 48 in the top heater duct 46; the blower 42; and the light 74; respectively. When the switching duty circuit breaker 86 is on, power is also supplied to the humidifier's high temperature limit sensor 160, the high temperature limit sensors S0, S2 in the heater duct 46, the humidistat 76, and the fixed and dry thermostats 78, 80. Also mounted on the top front panel are controls 90, 92 for the humidistat 76 and the dry thermostat 80, respectively, as well as indicator lights 94, 96 for the electric heating elements in the humidifier 10 and in the heater duct 46 respectively. The wiring and functioning of the various components mentioned in this paragraph will be described more fully subsequently.

Figure 2:
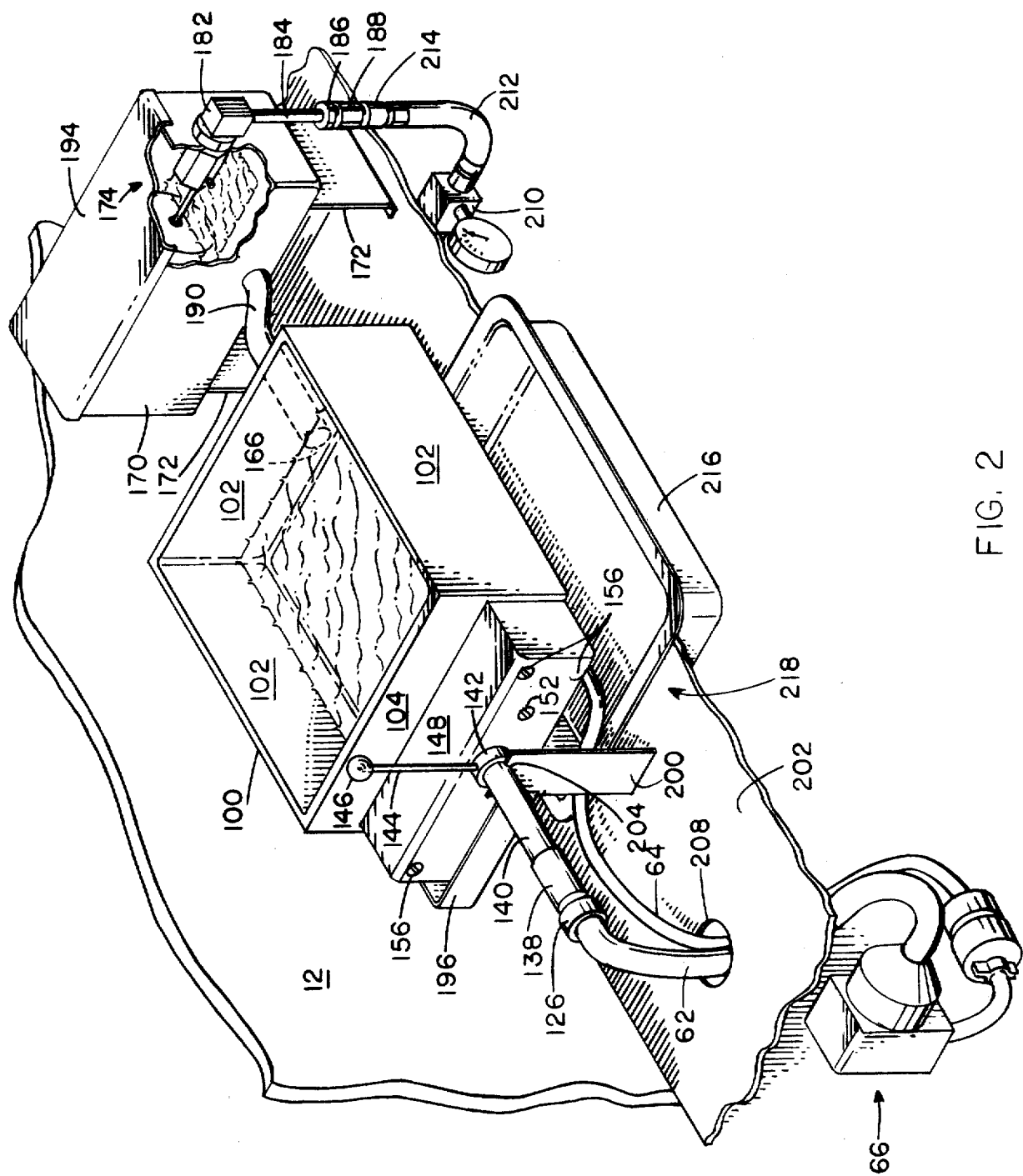
FIG. 2 is an isometric view of the humidifier of the present invention in operation, with portions broken away for clarity.
Figure 3A:
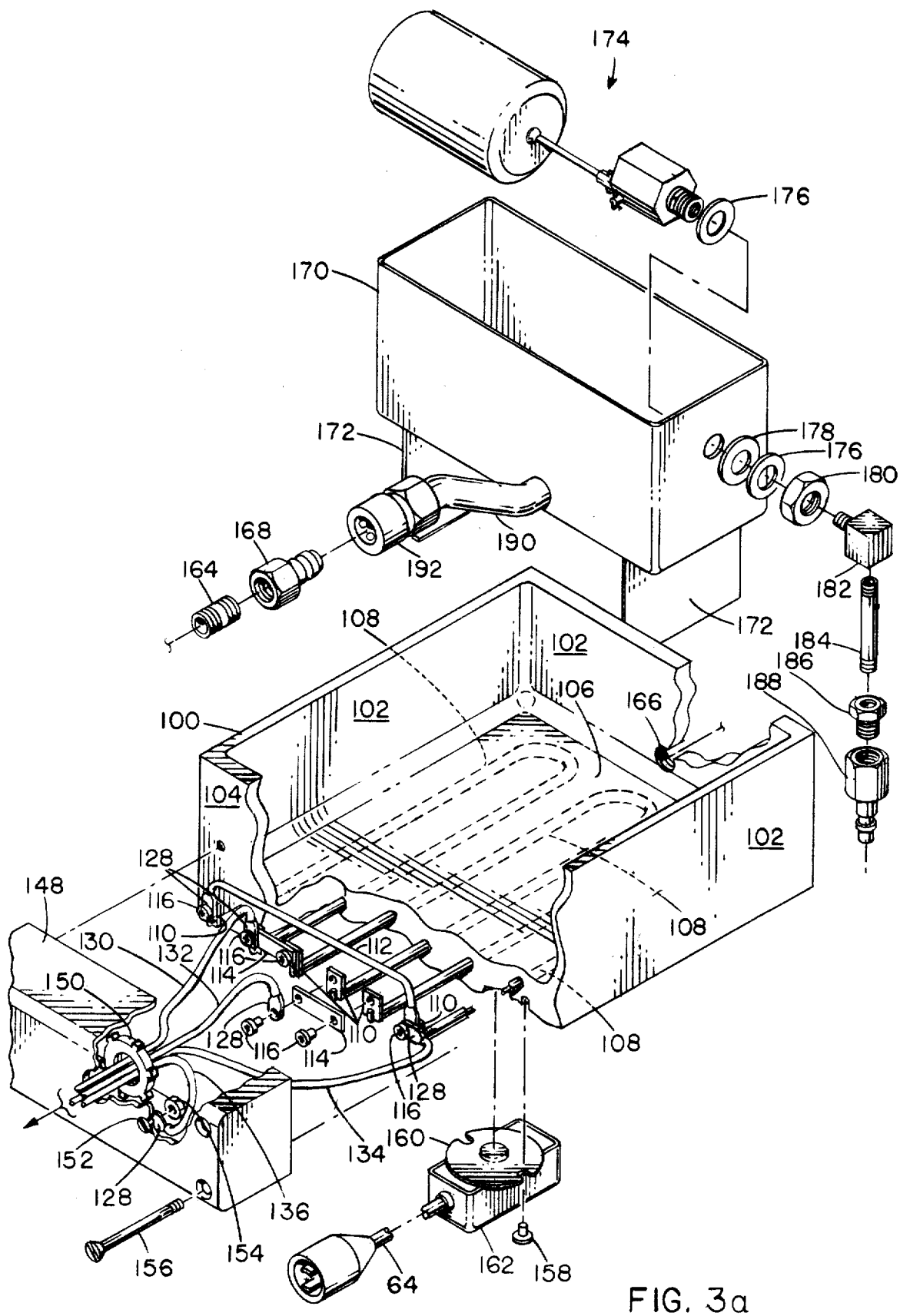
FIGS. 3a and 3b are exploded isometric views from an upper aspect of the humidifier shown in FIG. 2.
Figure 3B:
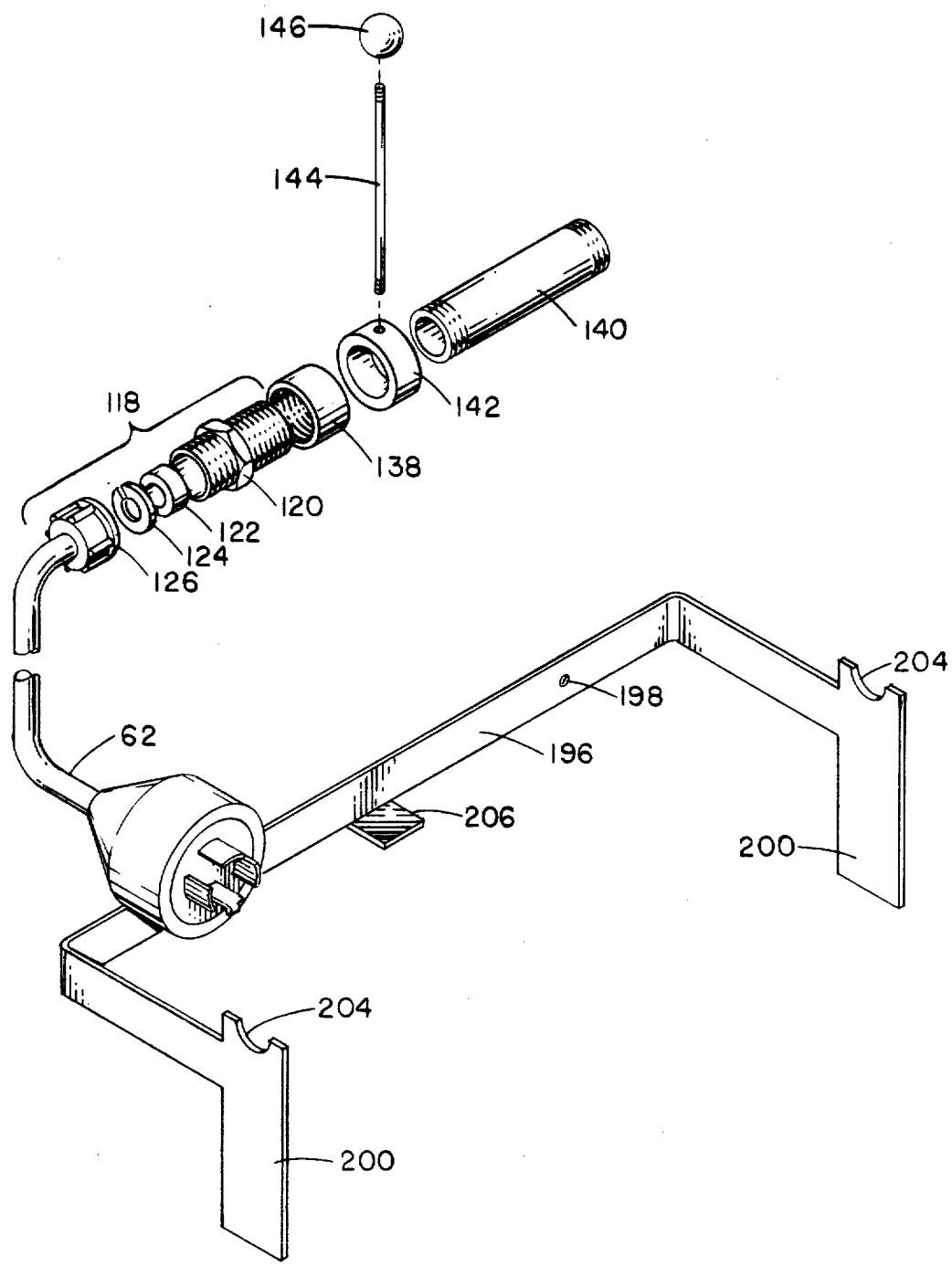

Referring now to FIGS. 2, 3a and 3b, a detailed description of the humidifier 10 of the present invention will now be given. The humidifier includes a heater pan 100 which may be, by way of example, 10" long, 8½" wide and 3" deep. Three sidewalls 102 are ¼" thick, one sidewall 104 is ⅜" thick, while its base 106 is about 1" thick.

Heat is supplied to the heater pan 100 by three U-shaped, rod type electric resistance heating elements 108 of conventional construction, such as Bundyweld Steel Tubular Heaters 0.315" in diameter manufactured by the Watlow Electric Manufacturing Co. of St. Louis, Mo. The ends of each heating element are waterproofed with any commercially available, high temperature resistant sealing compound such as RTV silicone rubber manufactured by the General Electric Co. of Waterford, N.Y. Both ends of each heating element 108 terminate in a terminal 110. Each heating element 108 produces about 1300 watts when supplied with 240 volts AC power, and produces about 1000 watts when supplied with 208 volts AC power.

The heater pan 100 is cast, in a clam shell mold using conventional casting procedures, from any suitable, sudden temperature change resistant aluminum such as that used in cooking utensils and may be type 380 or 356 produced by the ALCOA Aluminum Co. of the United States. Very importantly, each heating element 108 is cast in place in the base 106 of heater pan during the casting process, as is best seen in FIG. 3a. This has the important advantage that the heating elements 108 are protected from exposure to the environment, and in particular from contact with the water which is present in the heater pan 100 during use of the humidifier. This protection is important since no water deposited minerals, scale or the like can be deposited on the heating elements 108, which deposits might otherwise reduce the efficiency of the heating elements 108 in transferring heat to the water in the heater pan. Casting the heating elements in the base of the heater pan has the further advantage of insuring quick and uniform distribution of heat from the heating elements to the heater pan, and hence to the water in the heater pan, resulting in a humidifier having a very short warmup time. In addition, since the heating elements 108 are cast in the base of the heater pan, the heater pan 100 acts as a heat sink and radiator for the heating elements 108. Thus, when the heater pan is sized as has been described it has been found that even should the heater pan run dry during use and power to the heating elements is uninterrupted, the heating elements will not burn out. This is an important advantage since it insures a humidifier in which it is very unlikely that the heating elements 108 will ever have to be replaced.

As seen, the heating elements 108 have been wired in a conventional delta configuration for the use of 3-phase AC power by use of an insulated wire 112 and two shunts 114 which are electrically connected to the terminals 110 of the heating elements 108 by screws 116.

Referring now to FIG. 3b, power is supplied to the heating elements 108 by a standard 4 wire power cord 62 which is prepared for use by first stripping each wire of insulation up to the location of the cord grip assembly 118. The assembly 118 comprises an adapter 120; a rubber moisture seal 122 which fits partially into one end of the adapter 120; a plastic C-clamp 124 which fits over the unstripped portion of the power cord 62; and an end cap 126 which fits over the C-clamp 124 and the rubber seal 122 and screws onto one end of the adapter 120. The cord grip assembly serves to prevent the power cord 62 from accidentally being torn out of the humidifier 10.

A terminal 128 is attached to the end of each of the four wires 130, 132, 134, 136 of the power cord 62 and then any suitable, high temperature resistant, high voltage, heat shrinkable plastic tubing, Kynar tubing, irradiated, cross linked, heat shrinkable extruded polyvinylidene fluoride #FIT 350 made by the Alpha Wire Company of Elizabeth, N.J., is heat shrunk in place over each of said four wires in the usual fashion.

Next, said four wires are passed through the cord grip assembly 118, which is attached to the power cord 62 in the usual fashion. Said four wires are then passed through a phenolic heat barrier 138 and a stainless steel pipe 140. The adapter 120 of the cord grip assembly, the heat barrier 138 and the pipe 140 are then screwed together and said four wires are then potted within elements 120, 138 and 140 by use of any high temperature resistant sealing compound such as that previously described. The heat barrier and the potting of said four wires serve the important function of keeping the power cord 62 relatively cool despite the high temperature of the heater pan 100.

Then a collar 142 is passed over the pipe 140, a handle 144 is screwed into the collar, and a handle knob 146 is screwed onto one end of the handle. The handle 144 acts as a set screw which releasably secures the collar 142 and handle 144 to the pipe 140 in the usual fashion.

Next one end of the pipe 140 is screwed into a terminal cover 148 and secured thereto by a lock nut 150. The ground wire 136 of the power cord 62 is grounded to the terminal cover 148 by a screw 152 and a nut 154, and the wires 130, 132, 134 of the power cord are connected to respective terminals 110 of the heating elements 108 by screws 116, as shown in FIG. 3a. The terminal cover 148 is secured to the heater pan 100 by four screws 156 and provided with a moisture barrier by sealing the contact area between the cover 148 and heater pan 100 with a high temperature resistant sealing compound of the type previously described.

Affixed to the base of the heater pan 100 by screws 158 is a conventional high temperature limit sensor 160 such as a Therm-O-Disc brand sensor, model WA11, produced by Thermodisc, Inc., a subsidiary of the Emerson Electric Company of Mansfield, Ohio. The sensor 160 opens at a temperature of 300° F. and automatically recloses when the temperature declines to 260° F. As will be described subsequently, when the sensor 160 opens, power to the heater pan's heating elements 108 is cut off, thereby preventing any possible overheating of the heater pan. The sensor 160 is potted in a protective cover 162 with high temperature resistant sealing compound of the type previously described and has its terminals connected to a two wire power cord 64 of conventional construction.

Finally, a nipple 164 is screwed into the inlet 166 of the heater pan 100 and the male half 168 of a conventional quick release coupling is screwed to the nipple 164.

Now, attention will be given to the assembly of the reservoir tank 170 and its associated components. The tank 170 is made from stainless steel and is supported by a pair of supports 172 secured thereto as by welding. A conventional float controlled valve assembly 174 regulates the flow of water into the tank 170 and is assembled thereto with washers 176 and a rubber gasket 178 by a nut 180. An elbow 182, a nipple 184, a reducing bushing 186 and a male half 188 of a quick disconnect coupling of the type including a valve which closes when the coupling is disconnected are then screwed together.

Next, a dog leg conduit 190 is welded to the outlet of the tank 170 adjacent the bottom thereof and the female half 192 of a conventional quick disconnect coupling is welded to the other end of the dog leg conduit 190. When the humidifier 10 is assembled as described below, the outlet of the reservoir tank is displaced about two inches below the inlet 166 of the heater pan, the dog leg conduit 190 permitting such displacement. This displacement serves the very important function of preventing hot water from the heater pan 100 from moving into the conduit 190 and reservoir tank 170 caused by the difference in temperature between the hot water in the heater pan 100 and the cooler water in the conduit 190 and tank 170. Otherwise hot water from the heater pan might flow by convection currents and otherwise from the heater pan into the conduit 190 and tank 170 and around the float controlled valve assembly 174 thereby likely clogging or otherwise rendering these components inoperative by depositing scale, minerals, water deposits of the like in, on, and around them.

The tank 170 is provided with a cover 194 which serves the important function of preventing changes in air pressure, such as caused by the operation of the blower 42 or by the doors of the proof box 14 being opened and closed, from activating the float controlled valve assembly 174 and thus possibly overfilling the heater pan 100 with water.

The humidifier 10 is assembled in the proof box by first affixing the stand 196 in the plenum by means of a pair of screws which pass through holes 198 in the stand and screw into the rear wall 12 of the proof box. When so affixed, the stand's legs 200 rest on the bottom wall 202 of the plenum. The heater pan is then rested on a pair of arcuate recesses 204 in the tops of the stand's legs 200 with its pipe 140 resting in one recess 204 and a milled portion of its male half 168 of a quick disconnect coupling resting in the other recess 204. A stop 206 on the stand prevents the rear edge of the heater pan 100 from rotating downwardly, thus supporting the heater pan in a horizontal orientation.

The power cords 62 and 64 for the humidifier are then passed through a 2½ inch hole 208 in the bottom wall of the plenum and plugged into their respective outlets 66.

Next the reservoir tank 170 and its associated components are placed on the bottom wall 202 of the plenum and the male 168 and female 192 portions of the quick disconnect coupling are connected. As has been mentioned, water for the reservoir tank is supplied through a water line 60 which enters the proof box through its rear wall 12. The water line 60 includes a filter, not shown, to remove foreign matter and a pressure regulator 210 which maintains water pressure to the float controlled valve assembly 174 at 20-30 psi to prevent overloading of the valve assembly 174. The water line 60 also includes a short length of flexible hosing 212 which terminates in the female half 214 of a quick disconnect coupling of the type which includes a valve which is closed when the coupling is disconnected. Water is supplied to the reservoir tank 170 by connecting the male 188 and female 214 portions of the quick disconnect coupling.

As seen in FIG. 2, a shallow drain pan 216 is removably installed in a recess 218 in the bottom wall 202 of the plenum beneath the heater pan 100.

After the humidifier 10 has been so assembled in the plenum 34, the plenum's cover plate 58 is installed and the humidifier is ready for use.

Referring now to FIG. 2, it is seen that the reservoir tank and the float controlled valve assembly 174 maintain the level of water in the heater pan 100 at about ½ inch deep. Electric power supplied to the heating elements 108 through the electric cord 62 provide heating power which maintains the water in the heater pan 100 at a vigorous boil until the desired humidity is reached in the proof box 14, as regulated by the humidistat 76.

The maintenance of about one-half inch of water in the heater pan 100 during use has several important advantages. It has been discovered that when the water is maintained at such a shallow depth, there is little or no spatter or splash from the boiling water. As a consequence, there is no undesireable accumulation of water within the plenum 34 caused by such spattering or splashing. In distinct contrast, the prior art humidifier of which applicant is aware in which rod type heater elements are immersed in about 3 to 3½ inches of water in a heater pan, a great deal of such undesirable spattering and splashing did occur.

In addition, it has been discovered that when only about ½ inch of water is maintained in the heater pan 100, a greater volume of steam is emitted therefrom than if the water were maintained at a greater depth.

A further advantage of maintaining only about ½ inch of water in the heater pan during use is that the splashing of the boiling water on the sidewalls 102, 104 of the heater pan is reduced to a minimum, thereby reducing the amount of water deposits, scale and the like which must be periodically removed therefrom.

After use of the humidifier, since the water is being evaporated and boiled away from the heater pan 100 during use, minerals, scale, water deposits and the like accumulate in the heater pan, soon mandating its cleaning in order to insure its continued operation and efficient transfer of heat from the heater pan to the water.

In order to clean the heater pan of such undesireable deposits and the like, it is preferred that the quick disconnect coupling 188, 214 in the water supply line 60 to the reservoir tank 170 be disconnected and the heater pan 100 then be allowed to boil dry. After being boiled dry, the heater pan will continue to heat up to about 300° F., as controlled by the humidifier's high temperature limit sensor 160. Then about a quart or so of cool water is suddenly added to the hot heater pan by hand from any suitable container.

Figure 4:
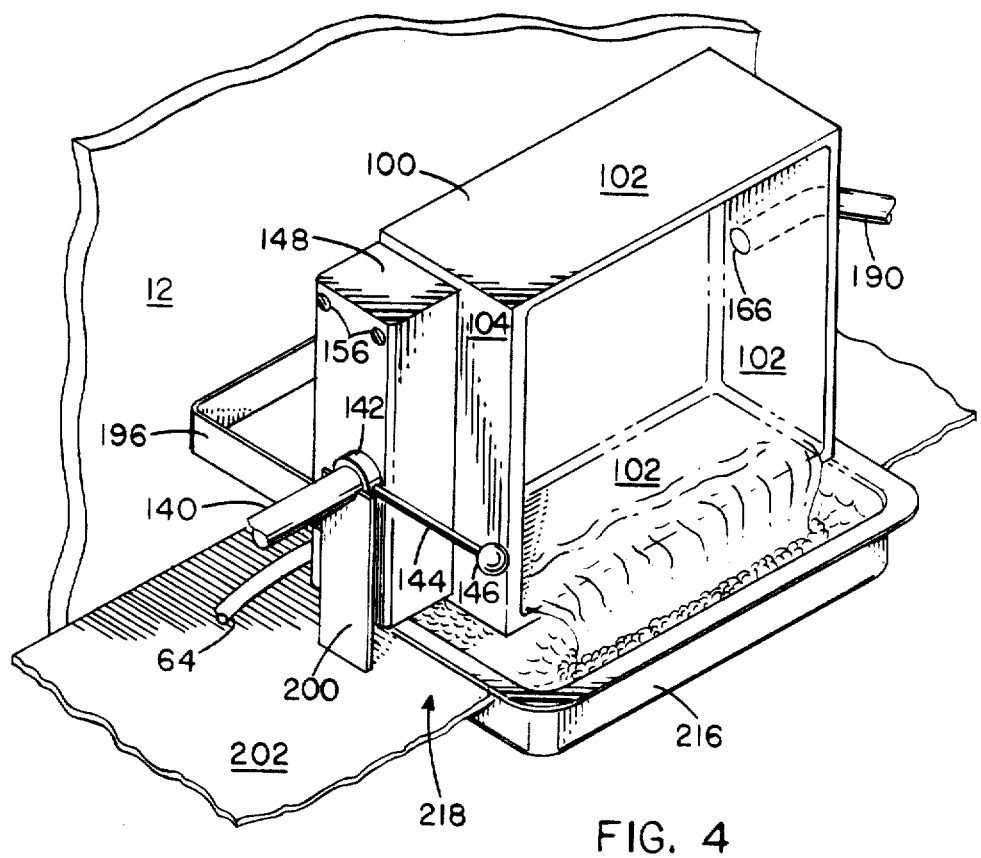
FIG. 4 is an isometric view from an upper aspect showing the heater pan of the humidifier shown in FIGS. 2, 3a and 3b rotated about its horizontal axis and emptying its contents into a drip pan.

After being allowed to boil for a few minutes, the water and the removed minerals, scale and water deposits can be drained from the heater pan into the drain pan 216 by rotating the heater pan on its stand 196 by use of the handle 144 as shown in FIG. 4. The coupling 168, 192 in the dog leg conduit 190 between the reservoir tank 170 and the heater pan 100 permits such rotation of the heater pan about its horizontal axis, while the natural flexing of the electric cords 62, 64 at the other end of the heater pan do not affect its rotation about said horizontal axis. If all of the accumulated scale and the like have not been removed, the cleaning procedure described above can be repeated as necessary.

It is theorized that the thermal shock caused by the cool water suddenly being added to the hot heater pan, as well as the vigorous boiling action of the water caused by the 300° F. heater pan, loosens and removes said scale, minerals, and the like.

It should be noted that as long as the high temperature limit sensor 160 is operating, the heater pan will not exceed a temperature of about 300° F. However, it has been found that if the sensor 160 fails and does not open, and the heater pan is allowed to continue to heat while dry, it will reach a maximum temperature of about 525-550° F. while the blower 42 continues to operate. Since the heater pan acts as a heat sink and radiator for the heating element, once the equalibrium temperature of 525-500° F. is reached, the heater pan will not increase its temperature further. It has been found that because of the action of the blower and because the heater pan acts as a heat sink and radiator for the heating elements 108, even should sensor 160 fail and remain closed, the heating elements 108 will not be destroyed because such temperatures are insufficient to cause failure of the same.

Figure 5:
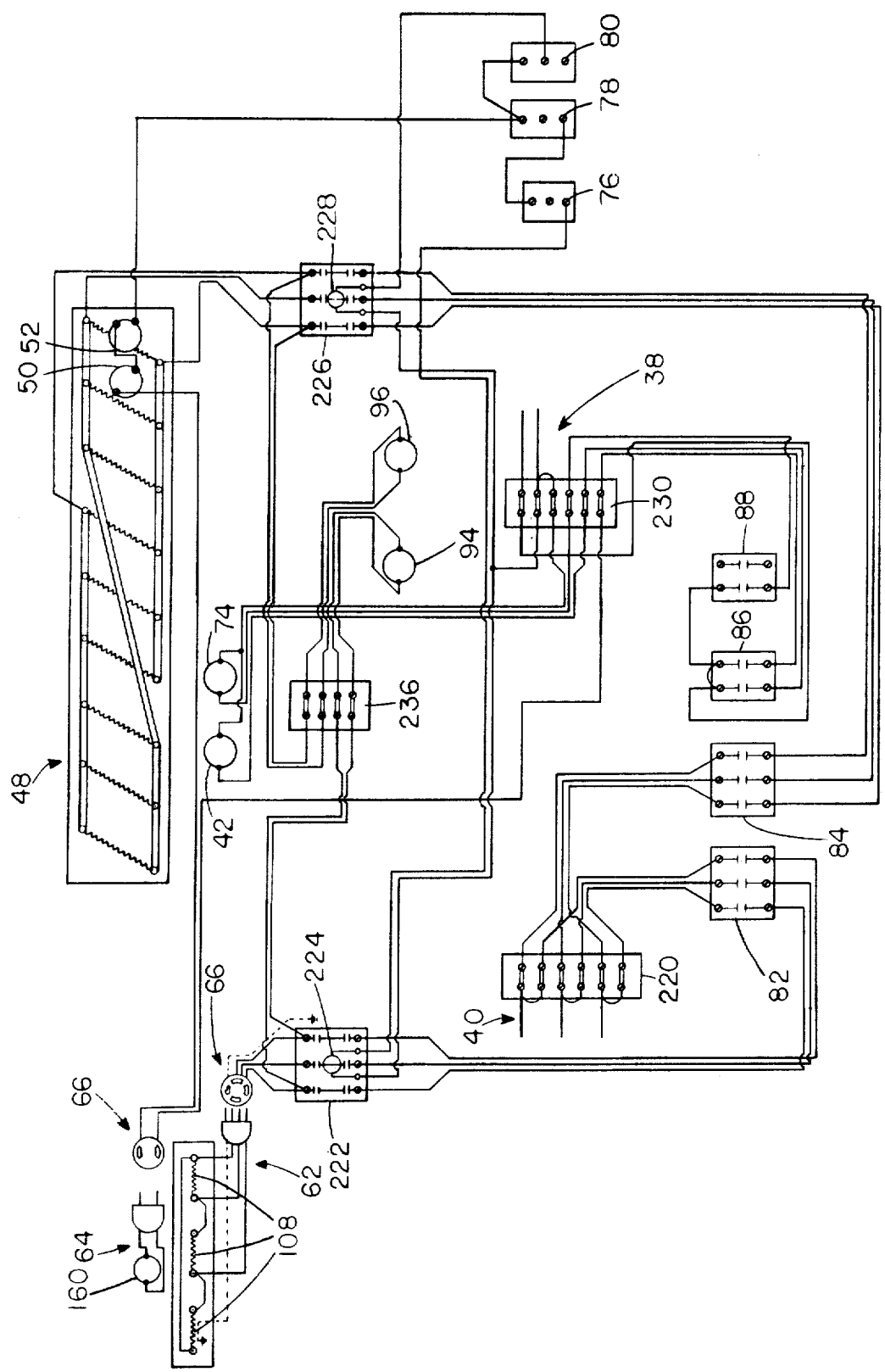
FIG. 5 is a schematical representation of the electrical circuits of the proof box and proof box humidifier shown in FIGS. 1-4.

Turning now to FIG. 5, an electrical schematic diagram in pictorial form is shown for the proof box 14, including the humidifier 10 of the present invention. Three-phase AC 208 or 240 volt AC power is supplied to the proof box through a power line 40 which enters the terminal box 36 on the ceiling of the proof box as shown in FIG. 1. Of course, single phase AC power could be used if so desired, and the heating elements 108 in the heater pan could be suitably wired to accept such power. 115 volt single phase AC power is supplied to the proof box through a power line 38 which also enters into the terminal box on the ceiling of the proof box.

Referring again to FIG. 5, the 3-phase input power to the terminal box is conveyed to a terminal strip 220, located in the terminal box 36, which is wired in parallel to two 30 amp. switching duty circuit breakers 82, 84 of conventional construction which supply power respectively to the heating elements 108 in the humidifier and to the heating elements 48 in the top, heater duct 46. As shown, the heating elements in the top, heater duct are also wired in a delta configuration for 3-phase power but could be suitably wired to accept single phase AC power.

Power from the humidifier's circuit breaker 82 is supplied to the heating elements 108 in the humidifier through a 40 amp. contactor or relay 222 which is controlled by a 120 volt coil 224. Three-phase AC power is supplied to the heating elements 48 in the heater duct 46 from the switching duty circuit breaker 84 via another 40 amp. contactor or relay 226 also having a 120 volt actuator coil 228.

The proof box's light 74 is supplied with power from a 115 volt terminal strip 230 located in the terminal box 36 through a 15 amp switching duty circuit breaker 86. The squirrel cage blower 42 for the proof box is supplied with 115 volt power through the terminal strip 230 and through a 15 amp circuit breaker 86.

As shown in FIG. 5, 115 volt power is also supplied from the terminal strip 230 and second circuit breaker 86 to the wired in series humidifier high temperature limit sensor 160, the manually and automatically resetting high temperature limit sensors 50, 52, the fixed thermostat 78, and the humidistat 76. The fixed thermostat and the dry thermostat 80 are wired as shown.

The two high limit sensors 50, 52 in the heater duct 46 are of conventional construction and are normally closed, one being an automatically resetting type sensor 52 which automatically opens when the temperature of the air within the heater duct reaches 210° F. As extra protection, the second high limit sensor 50 opens at 325° F. and must be manually reset.

As will be apparent from FIG. 5 if any of the sensors 160, 50, 52 open, power to the heating elements 108 and 48 for the humidifier 10 and the heater duct 46 is turned off.

The humidistat 76, which is normally closed and opens when the relative humidity within the proof box reaches a predetermined value, typically 80%, controls the power to the coil 224 in the contactor 222, which supplies power to the electric heating elements 108 in the humidifier. When the humidity in the proof box reaches the desired level, the humidistat opens thereby turning off the power to the coil 224 which opens the contactor 222 and turns off the power to the heating elements 108 in the humidifier. Should the humidity within the proof box drop below the desired level, the humidistat closes once again thereby restoring power to the heating elements in the humidifier. The humidistat is of conventional construction, such as model WA3A-14 produced by the Penn Division, Johnson Controls, Inc. of Goshen, Ind.

Power to the heating elements 48 in the heater duct is controlled by the dry thermostat 80 which is normally closed and opens when the temperature it senses rises to the desired value. The dry thermostat controls power to the coil 228 of the contactor 226 which controls power to the heating elements 48. When the temperature in the proof box drops below the desired value, the dry thermostat 80 closes, thereby restoring power to the coil 228 which closes the contactor 226, and restores power to the heating elements 48.

It should be noted that, as has been mentioned, the humidistat 76 is wired in series with the fixed thermostat 78. The fixed thermostat is wired so as to be normally open and is set to close when the temperature within the proof box rises to 80° F. for example. Thus, it will be understood that no power is supplied to the humidistat, and hence no power is supplied to the heating elements 108 in the humidifier until the temperature in the proof box reaches 80° F., at which time the preset thermostat closes and supplies power to the humidistat. The purpose of such a feature is to prevent the humidifier 10 from being actuated when the proof box is cold, and before the heating elements in the heater duct have increased the temperature of the proof box to the desired level.

It will be readily appreciated that should power be supplied to the humidifier 10 while the proof box is cold, the moisture supplied by the humidifier would simply condense on the cool walls of the proof box, an undesirable condition which should be avoided. The thermostats 78, 80 are of conventional construction such as model A-19BAC-1 produced by Penn Division of Johnson Controls, mentioned above.

Power to the blower 42 is supplied through the terminal strip 230 and switching duty circuit breaker 86. An examination of FIG. 5 will disclose that the blower will continue to operate even though the desired temperature and humidity is reached in the proof box 14, to ensure air circulation within the proof box at all times when the proof box is in use.

Indicator lights 94, 96 for the heating elements 108, 48 of the humidifier and heater duct, respectively, show when power is being applied to said heating elements. As seen in FIG. 5 the lights 94, 96 receive power from a terminal strip 236 located in the terminal box 44. As also seen, the lights 94, 96 are wired to the load side of their respective contactors 222, 226 and thus will light only when power is actually being supplied to their respective heating elements 108, 48.

From the foregoing, various further applications, modifications, and adaptations of the apparatus disclosed and the invention embodied therein will now be apparent to those skilled in the art to which the invention is addressed, within the scope of the following claims.

I claim:

1. A fast warmup, high capacity humidifier for a proof box comprising:
 (a) a heater pan means including:
  (i) a heater pan having a base, a peripheral sidewall entending upwardly therefrom wherein said heater pan is adaped to receive and hold a shallow pool of water, and (ii) an electric heating element means for heating at least substantially the entire said base to a temperature sufficient to vigorously boil at least substantially the entire said shallow pool of water to quickly produce large volumes of steam to quickly humidify the interior of said proof box during operation of the humidifier;

(b) a water supply means adapted for maintaining said shallow pool of water at a preselected depth during operation of the humidifier;

(c) a water supply conduit means adapted for conveying water from said water supply means to the interior of said heater pan means;

(d) support means for supporting said heater pan means for selective rotation about a horizontal axis;

(e) swivel coupling means located in said water supply conduit means between said water supply means and said heater pan means; and (f) a drip pan removably mounted to said support means beneath said heater pan;

wherein when it is desired to empty said heater pan means, such as for cleaning, said heater pan means may be rotated on said support means to dump the contents thereof into said drip pan, without the necessity of disconnecting said water supply conduit means.

2. A fast warmup, high capacity humidifier for a proof box comprising:

(a) a heater pan means including:
  (i) a heater pan having a base, a peripheral sidewall entending upwardly therefrom wherein said heater pan is adapted to receive and hold a shallow pool of water, and
  (ii) an electric heating element means for heating at least substantially the entire said base to a temperature sufficient to vigorously boil at least substantially the entire said shallow pool of water to quickly produce large volumes of steam to quickly humidify the interior of said proof box during operation of the humidifier; wherein said electric heating element means is located and cast within said base to further insure quick even distribution of heat from said heating element means to said base, and to protect said heating element means from the environment, and in particular from contact with said water in said heater pan to prevent corrosion and early failure of said heating element means;

(b) a water supply means adapted for maintaining said shallow pool of water at a preselected depth during operation of the humidifier;

(c) a water supply conduit means adapted for conveying water from said water supply means to the interior of said heater pan means;

(d) support means for supporting said heater pan means for selective rotation about a horizontal axis;

(e) swivel coupling means located in said water supply conduit means between said water supply means and said heater pan means; and (f) a drip pan removably mounted to said support means beneath said heater pan;

wherein when it is desired to empty said heater pan means, such as for cleaning, said heater pan means may be rotated on said support means to dump the contents thereof into said drip pan, without the necessity of disconnecting said water supply conduit means.

3. The humidifier for a proof box according to claims 1 or 2, wherein the axis of rotation of said swivel coupling is coaxial with the axis of rotation of said heater pan means upon said support means, to permit the level rotation of said heater pan means upon said support means.

4. A fast warmup, high capacity humidifier for a proof box comprising:

(a) a heater pan means including:
  (i) a heater pan having a base, a peripheral sidewall entending upwardly therefrom wherein said heater pan is adapted to receive and hold a shallow pool of water, and
  (ii) an electric heating element means for heating at least substantially the entire said base to a temperature sufficient to vigorously boil at least substantially the entire said shallow pool of water to quickly produce large volumes of steam to quickly humidify the interior of said proof box during operation of the humidifier;

(b) a water supply means adapted for maintaining said shallow pool of water at a preselected depth during operation of the humidifier; and (c) a water supply conduit means adapted for conveying water from said water supply means to the interior of said heater pan means;

wherein said water supply conduit means has an inlet communicating with the interior of said water supply means and an outlet communicating with the interior of said heater pan, wherein said outlet is entirely at least as high in elevation as said inlet to prevent, during use, undesirable backflow or boiling water from said heater pan into said water supply means caused by said boiling water being of higher temperature than the water in said conduit means and water supply means.

5. A fast warmup, high capacity humidifier for a proof box comprising:

(a) a heater pan means including:
  (i) a heater pan having a base, a peripheral sidewall entending upwardly therefrom wherein said heater pan is adapted to receive and hold a shallow pool of water, and
  (ii) an electric heating element means for heating at least substantially the entire said base to a temperature sufficient to vigorously boil at least substantially the entire said shallow pool of water to quickly produce large volumes of steam to quickly humidify the interior of said proof box during operation of the humidifier; wherein said electric heating element means is located and cast within said base to further insure quick even distribution of heat from said heating element means to said base, and to protect said heating element means from the environment, and in particular from contact with said water in said heater pan to prevent corrosion and early failure of said heating element means;

(b) a water supply means adapted for maintaining said shallow pool of water of a preselected depth during operation of the humidifier; and (c) a water supply conduit means adapted for conveying water from said water supply means to the interior of said heater pan means;

wherein said water supply conduit means has an inlet communicating with the interior of said water supply means and an outlet communicating with the interior of said heater pan, wherein said outlet is entirely at least as high in elevation as said inlet to prevent, during use, undesirable backflow of boiling water from said heater pan into said water supply means caused by said boiling water being of higher temperature than the water in said conduit means and water supply means.

6. The humidifier according to claim 1 or 4, wherein said electric heating element means is located within said base to insure quick, even distribution of heat from said heating element means to said base, and to protect said heating element means from the environment and in particular from contact with said water in said heater pan to prevent corrosion and early failure of said heating element means.

7. The humidifier according to claim 6, wherein said electric heating element means is cast within said base to further insure quick, even distribution of heat from said heating element means to said base, and to protect said heating element means from the environment, and in particular from contact with said water in said heater pan to prevent corrosion and early failure of said heating element means.

8. The humidifier according to claim 1, 2, 3, 4 or 5, wherein said heater pan acts as a heat sink and as a radiator for said heating element means and is sized to absorb and radiate enough heat from said heating element means in the event said heater pan runs dry during use to prevent the burnout of said heating element means.

9. The humidifier for a proof box according to claims 1, 2, 3, 4 or 5, wherein said water supply means is adapted to maintain said water in said heater pan at a depth of about $\frac{1}{8}$ inch during operation of the humidifier to reduce the amount of time needed for the humidifier to produce steam after being actuated and to increase the amount of steam generated by said heater pan means during use, as compared to when a higher level of water is maintained in said heater pan.

10. The humidifier for a proof box according to claims 1, 2, 3, 4 or 5, wherein said heater pan means are formed from cast aluminum.

* * * * *